United States Patent [19]

Lim et al.

[11] 4,356,113

[45] Oct. 26, 1982

[54] SUBSTRATES WITH CALIBRATED PORE SIZE AND CATALYSTS EMPLOYING THE SAME

[75] Inventors: John Lim, Anaheim; Michael Brady, Studio City; Kirk Novak, Fullerton, all of Calif.

[73] Assignee: Filtrol Corporation, Los Angeles, Calif.

[21] Appl. No.: 207,142

[22] Filed: Nov. 17, 1980

[51] Int. Cl.$^3$ .................. B01J 29/06; B01J 35/00
[52] U.S. Cl. .................. 252/455 Z; 252/449; 252/455 R; 252/463; 252/477 R
[58] Field of Search ............. 252/455 Z, 455 R, 463, 252/449, 477 R

[56] References Cited

U.S. PATENT DOCUMENTS

| | | | |
|---|---|---|---|
| 2,691,598 | 10/1954 | Meurice et al. | 252/449 X |
| 2,840,618 | 6/1958 | Hecht | 252/477 R |
| 3,219,590 | 11/1965 | Ribaud | 252/455 Z |
| 3,235,512 | 2/1966 | Koepernik | 252/455 R |
| 3,525,775 | 8/1970 | Bolton et al. | 252/455 Z |
| 3,526,602 | 9/1970 | Kobayashi et al. | 252/477 R |
| 3,676,330 | 7/1972 | Plank et al. | 252/455 Z |
| 4,123,390 | 10/1978 | Sherman et al. | 252/455 Z |
| 4,231,899 | 11/1980 | Chen et al. | 252/455 Z |

*Primary Examiner*—Carl F. Dees
*Attorney, Agent, or Firm*—Paul E. Calrow; Andrew E. Barlay

[57] ABSTRACT

This invention relates to a process for production of catalyst substrates and catalysts of calibrated pore size distribution by incorporation in and removal of particles of determined particle size from substrate or catalyst formulations.

8 Claims, No Drawings

SUBSTRATES WITH CALIBRATED PORE SIZE AND CATALYSTS EMPLOYING THE SAME

BACKGROUND OF THE INVENTION

The art of catalysis has recognized the importance of the distribution of total pore volume among the pores of various diameters.

It is generally recognized that catalysts and substrates for catalysts composed of micropores less than about 100 Å diameters are poisoned rapidly by metal compounds such as compounds of Ni, V and Fe which are present in many feed stocks. [See J. Cir and A. Crova, "Research Study of Catalysts for HDS Residual Oil," Int. Chem. Engr. 19(4) 671 (1975) cc Kang, et al. "Effect of Catalyst Pore Size Distribution upon Hydrodesulfurization of Heavy Coal Oil Liquids" ACS preprints, Div. of Petr. Chem. 23(4), 1412 (1978); see also, Mitchell, U.S. Pat. No. 3,944,482.]

There have been various expedients used in the prior art to modify the porosity of substrates and catalysts, particularly those employed for cracking and for desulfurizing hydrocarbon oil such as distillate and residual oils.

Organic polymers have been suggested, which by and large broadened the spectrum of pore size distribution. [See: D. Basmadjian, et al., Journal of Catalysis, Vol. 1, 547, etc. (1963); Sawyer, et al., U.S. Pat. No. 4,016,106 and 4,016,107; Roban, U.S. Pat. No. 4,016,108].

A problem which has been encountered in the prior art in attempting to modify the pore structure to increase pore volume in macropores is that high molecular weight polymers' increase of the macropores results also in an increase in the micropores. The result is to broaden the pore size distribution adding pore volume in both the micropore and macropore range. (Journal of Catalysis, Vol. 1, p. 552)

Low molecular weight polymer shifts the pore volume from the macropores to the region of the micropores. See for example, Journal of Catalysis, Vol. 1, supra, at page 553.

The problem with comparing the effect of the procedures described in the prior art on the pore size distribution as reported in the prior art is that the values reported depend on the procedures employed and the assumptions underlying the mathematical scheme for calculating the pore sizes from the isotherms which are the result of the test method. It is therefore improper to compare the results obtained by one method with those obtained by another method. The most that is permissible is to compare the result obtained by the various procedures reported in the prior art where sufficient data produced by the same test procedure is supplied. In the following disclosure, where pore diameters and pore volumes and surface areas are referred to, they are determined as described in the appendix.

The effectiveness of catalyst particles of a given chemical constitution and other physical characteristics in hydrocarbon conversion is increased by an increase in the pores of in the range of about 70 to 200 Å diameter. Such values are of the order of the nominal molecular diameter of the molecules of petroleum fractions.

Commercial zeolite containing cracking catalysts have used an alumino-clay matrix. They are produced in the form of spray dried microspheres which are deficient in the volume contained in the pores above 100 Å diameter. In such catalysts the pores are concentrated in the range of 20 to less than about 70 Å. The fraction of the total pore volume in that range is substantially greater than in the range of 70 to 200 Å.

Where the reaction which is catalyzed is an excessive carbon former, the inclusion of a substantial pore volume in the range of 250 to 750 Å and higher is useful to reduce carbon "plugging."

STATEMENT OF THE INVENTION

The problem with the prior art methods for modifying the pore structure of catalysts is that they are non-specific. While the methods do make modifications in the pore volume distribution between the pores of different size the result could not be predetermined. It is the objective of this invention to increase the fraction of the pore volume which appears in pores of selected diameters.

Catalysts may be formed by impregnation of substrates such as alumina, silica and silica alumina gels which have been extended to form cylindrical or non-cylindrical shapes which are then calcined. Such catalysts are described in U.S. Pat. No. 4,196,101 and in the patents cited in said U.S. Pat. No. 2,106,101. Another type of catalyst are the zeolite catalysts formed by combining a crystalline alumino silicate with a matrix such as are described in U.S. Pat. Nos. 4,010,116, 4,086,187, and 4,206,085. The patent and non-patent literature is very extensive.

Such zeolite catalysts include the zeolites of the faujasite type, but may also include zeolites such as mordenite or ZSM series, and others referred to in Breck "Zeolite Molecular Sieves" published by John Wiley and Sons. The matrix may include inorganic gels such as alumina, silica-alumino gels and clay in various combinations.

It is an object of our invention to alter the pore volume structure of substrates such as alumina, silica, and silica-alumina pellets or zeolitic catalysts composed of a crystalline alumino silicate-matrix complex by incorporation into the substrate or catalyst of a combustible solid particle whose particle size is known to be of the diameter of the pores in the substrate or catalyst whose pore volume it is desired to be amplified as a result of the addition of the particles. After the uniform dispersion of the particles, they are burned off and leave behind pore volume that had been occupied by the particles.

The procedure of our invention includes forming an intimate and uniform mixture of the components of the substrate or catalyst with the combustible solid particles, and then forming the mixture into pellets. The pellets may be of cylindrical or non-cylindrical shape as by extrusion through dies or by pilling by procedures conventional in this art. Where the mixture is to be formed into roughly shaped spherical particles, known as microspheres, of about 50 to 70 micron diameter as in the case of catalysts used in fluid cracking process, the intimate mixture is spray dried. The above shapes are all herein referred to as pellets.

We have found that we may increase the volume in pores of selected diameter in the range of 75 to 1000 Å, without materially altering the volume in the pores in ranges of diameter outside the selected range by incorporating combustable solid particles of the desired particle size into the substrate or catalyst. Upon burning of the particles, pores are left in the remaining body which are substantially of the diameter of the combustable particles. The pore volume and percent of the total pore volume in the resulting pores depend on the ratio of the weight of the combustible particles to the weight of the host body. Thus we may increase the percentage of the pores in the range of above about 70 to 200 Å or in the range above 200 Å without substantially altering the total volume of the pores in the range below 70 Å. Such catalysts have particular value in cracking of petroleum feed stocks which carry material amounts of compounds of nickel or vanadium.

Substrates and catalysts which have a major proportion of their pore volume in the range of less than 100 Angstrom may have their pore volume, which is in the pores in excess of 100 Ångstrom, increased by the process of our invention. The range of the diameters of the pores whose volumes are increased are those of the particle diameters of the combustible particles.

The shift in the pore volume is detectable by any of the several procedures for determination of the pore volume distribution, although the magnitude of the pore volume in the several range of pore volume may not be of the same numerical value if determined by another procedure, and therefore the degree of shift may not be of the same magnitude when measured by the various procedures. The procedure which we have employed is detailed in the appendix to this specification.

While any combustible solid particle of controlled particle size in the desired range may be used in carrying out the process of our invention, we prefer to employ carbon particles. These particles may be graphite but we prefer to use carbon black. Such carbon blacks are commercially available in various particle size in the range of 100 to 1550 Ångstrom diameter (determined from their electron micrographs).

The carbon blacks which we prefer are distinguished from other types of carbon blacks in that their water dispersions are substantially neutral.

We select the carbon blacks which have the particle diameter in the desired range.

After combustion of the carbon black, the pore volume of the host is amplified in the pores whose diameter is in the range in Å which extends to pores of lesser and greater diameter than that of the carbon black particles, within certain compositions.

When a substantial portion of the above range overlaps the range of pore diameter of the host particles, the resulting pore volume distribution is monomodal. When there is no substantial overlap, the distribution is polymodal.

In the case of a fluid cracking catalyst of the monomodal type in which the major portion of the pore volume is in the range 20 to 70 Ångstrom diameter, we may increase the pore volume in the range of about 100 to about 1500 Å by employing carbon blacks in that range.

When we desire to convert a catalyst from a monomodal type in which the majority pore volume is in the range of less than about 70 Ångstroms to a polymodal type having a substantial pore volume in a higher range, we may use carbon particles having particle sizes in the higher range, for example, of about 100 to about 1500 Å.

If it is desired to amplify or introduce amplification of pore volume in more than one range of the pore sizes of the catalyst or substrates, we may employ mixtures of carbon black particles of particle size in the ranges of the selected pore diameters in the proportions of the ratios of the relative magnitudes of the pore volumes desired in the selected ranges.

We have found that in order to obtain such results, it is preferable to peptize the carbon blacks. We may do so by acidifying a water dispersion of the black prior to incorporation into the catalyst or substrate which is then extruded. If it be of the type of spray dried microspheres, the acidified black may be incorporated into the spray drier feed slurry. Where the slurry is acidic or where an acidified matrix component such as alumina is used, the carbon black may be acidified prior to mixing with the host or acidified after mixing.

The following examples illustrate our invention.

EXAMPLE I

In the following example, the catalyst whose pore structure was modified had the following composition (based on the composite catalyst on a volatile free basis) 20% Type A pseudoboehmite (see Lim, et al., U.S. Pat. No. 4,206,085), 45% ball clay, 10% of ammonium polysilicate [see Lim, et al., supra (calculated as the $SiO_2$ equivalent to the weight of ammonium polysilicate)] and 25% by weight of an ammonium and rare earth exchanged Y zeolite. The Y zeolite had the following nominal composition:

| | | |
|---|---|---|
| wt. % $Na_2O$ | = | 1.56 |
| wt. % $NH_3$ | = | 0.46 |
| wt. % REO | = | 12.6 |

$SiO_2/Al_2O_3$ molar ratio of 4.8.

Six percent (6%) by weight of carbon black, based on the composite catalyst on a volatile free basis, was added to the aforesaid host composed of the zeolite clay alumina mixture. The carbon black had an average particle diameter of 130 Å.

The carbon black is dispersed in a nitric acid solution with high shear mixing (0.2 grams $HNO_3$ per gram of carbon black, volatile free).

The components of the catalyst were mixed as follows. The Type A alumina is mixed with the acidified carbon black and additional acid was added (0.156 grams of 70% $HNO_3$ per gram of $Al_2O_3$ volatile free). To this slurry the ball clay, the exchanged zeolite and the ammonium polysilicate were added and the slurry was passed through a high shear mill such as a colloid mill where the slurry is heated by the work done by the mill, for example to raise the temperature about 10° to about 30° F. The mixture is then spray dried. The spray dried microspheres were then heated in air at a temperature of about 900° to about 1000° F. for a time to completely burn off the carbon.

The following Table enumerates the percent of pore volumes in pores of various diameters determined from the desorption isotherm (procedure described in the appendix) for the catalyst with or without the carbon black.

The composition is of the monomodal type.

TABLE 1

| Pore Volume Range Å (Diam.) | No Carbon Black Pore Volume | | 6% Carbon Black* Pore Volume | |
|---|---|---|---|---|
| | cc/gm | % Total | cc/gm | % Total |
| 300–600 | .02 | 6.1 | .03 | 7.6 |
| 200–300 | .01 | 3.9 | .03 | 5.2 |
| 100–200 | .03 | 8.9 | .08 | 20.6 |
| 50–100 | .15 | 47.0 | .17 | 41.7 |
| 20–50 | .11 | 34.0 | .10 | 25.0 |

TABLE 1-continued

| Pore Volume Range Å (Diam.) | No Carbon Black Pore Volume | | 6% Carbon Black* Pore Volume | |
|---|---|---|---|---|
| | cc/gm | % Total | cc/gm | % Total |
| TOTAL | 0.32 | | 0.40 | | cc/gm = cubic centimeters per gram
Å = Angstrom
*130 Å Diameter Carbon Black.

References to Table 1 show that there has been an amplification in the pore volume in the range above 100 Å with the major increase in the range of about 100 to 300 Å diameter. The distribution remains monomodal.

EXAMPLE II

This example illustrates the use of the carbon blacks to form a polymodal distribution.

The catalyst was formulated as in Example I, without acid dispersion, but in this case the carbon black had the nominal average particle size of 330 Å diameter. Three catalysts were formed using 3, 6 and 9% carbon black based on the host catalyst mixture, all percentages on a volatile free basis.

TABLE 2

| (330 Å) Percent Carbon Black Pore Diameter Range Å | 0% Pore Volume | | 3% Pore Volume | | 6% Pore Volume | | 9% Pore Volume | |
|---|---|---|---|---|---|---|---|---|
| | % Total | cc/gm | % Total | cc/gm | % Total | cc/gm | % Total | cc/gm |
| 300–600 | 10.8 | 0.038 | 15.1 | 0.05 | 23.1 | 0.095 | 24.5 | 0.11 |
| 200–300 | 6.1 | 0.021 | 6.9 | 0.025 | 7.1 | 0.029 | 6.6 | 0.03 |
| 100–200 | 13.4 | 0.047 | 13.7 | 0.049 | 12.3 | 0.05 | 12.1 | 0.055 |
| 50–100 | 43.9 | 0.153 | 39.8 | 0.143 | 34.9 | 0.143 | 35.3 | 0.159 |
| 30–50 | 25.9 | 0.091 | 24.4 | 0.088 | 22.7 | 0.093 | 21.4 | 0.096 |
| TOTAL | | 0.35 | | 0.36 | | 0.41 | | 0.45 | cc/gm = cubic centimeters per gram
Å = Angstroms

The increase of pore volume due to the addition of the carbon black is substantially in the pores above 300 Å with no substantial change in the pores below 300 Å. The form is polymodal. The magnitude of the change increases with increase in the percent of carbon black.

EXAMPLE III

The catalyst was formed by vigorously mixing a peptized Type A alumina, ball clay, ammonium polysilicate and an ammonium and rare earth exchanged Y zeolite, and carbon black in the proportions on a volatile free basis as stated below.

25% by weight of a Y zeolite
20% by weight Type A alumina
10% $SiO_2$ (equivalent of the ammonium polysilicate)
45% ball clay To this mixture was added 0, 3, 6 and 9% by weight of carbon black having a nominal average particle diameter of 500 Å diameter.

The Y zeolite had the following composition:

$SiO_2/Al_2O_3$ molar ratio of 4.8

| $Na_2O$ | = | 1.78% by weight |
|---|---|---|
| REO | = | 14.4% by weight |
| $NH_3$ | = | 0.41% by weight |

The components were mixed using the Cowles Dissolver. The Type A alumina was peptized (using 0.095 ml. of 90 wt. % formic acid per VF gram of alumina). The 550 Å carbon black (if used), ball clay, exchanged zeolite, and ammonium polysilicate were added consecutively with fast (high shear) mixing after each addition. The final slurries (20 wt. % solids) were spray dried.

The spray dried microspheres were calcined at 1050° F. for twenty four hours in a muffle furnace in order to burn out the carbon black. The physical properties of the calcined samples are reported in Table 3.

TABLE 3

| Pore Volume Range Å (Diam.) | 0% Carbon Pore Volume | | 3% Carbon Pore Volume | | 6% Carbon Pore Volume | | 9% Carbon Pore Volume | |
|---|---|---|---|---|---|---|---|---|
| | cc/gm | % Total | cc/gm | % Total | cc/gm | % Total | cc/gm | % Total |
| 300–600 | 0.041 | 11.6 | 0.07 | 16.4 | 0.08 | 17.8 | 0.10 | 22.9 |
| 200–300 | 0.02 | 5.7 | 0.03 | 7.2 | 0.03 | 6.1 | 0.03 | 6.3 |
| 100–200 | 0.05 | 12.3 | 0.06 | 13.3 | 0.05 | 12.7 | 0.05 | 11.5 |
| 50–100 | 0.16 | 40.3 | 0.16 | 37.9 | 0.15 | 35.7 | 0.16 | 35.2 |
| 30–50 | 0.11 | 30.1 | 0.11 | 25.2 | 0.12 | 27.2 | 0.11 | 24.2 |
| TOTAL | 0.38 | | 0.42 | | 0.43 | | 0.46 | |

As will be seen from Table 3, there is substantially no change in the pore volume in pores less than 300 Å. The increase in pore volume is concentrated in the range of 300 to 600 Å. The pore volume is polymodal. One mode in the range of below about 100 Angstrom and the other in the range of about 300 to 600 Å. The magnitude of this effect increases with increase in the concentration of the carbon black.

It thus appears that the diameter of the pores whose pore volume is amplified extends to both sides of the nominal average pore diameter. In the case of the 130 Å particles the pores whose volume were substantially amplified ranged from 100 Å to 300 Å. In the case of the 330 Å particles, the amplified pore region ranged from 200 to 600 Å. In the case of the 550 Å particles, the amplified range was from about 300 to 600 Å.

EXAMPLE IV

This example illustrates the improvement in the resistance to metal poisoning resulting from the addition of porosity introduced by the procedure of our invention.

A catalyst formed as in Example I with 3, 6, 9 and 12% of the carbon black (130 Å diameter).

A 50 gram catalyst formed as in Example I (50 g VF) was saturated with acetone, then an acetone solution containing nickel nitrate and vanadyl acetylacetonate was added. The catalyst slurry was thoroughly stirred while the acetone was slowly evaporated. The amount of nickel and vanadium compound which was added as the equivalent elementary metals) was 2800 parts per million of nickel and 1000 parts per million of vanadium on a volatile fee basis, i.e. nickel equivalent of 3000 (Ni+0.2 V).

After the acetone was removed by evaporation, the catalyst was calcined for one hour at 1050° F. in order to decompose, the nitrates and acetylacetonates leaving the metal oxides deposited on the catalyst. The catalyst was evaluated for its catalytic M activity in microactivity (see Appendix).

The M activity [after steaming at 1450° F. (see Appendix)], gas producing factor (GPF) and carbon producing factor (CPF) of the catalysts which were carbon loaded and then calcined as above is stated in Table 4.

TABLE 4

| % Carbon | % Conversion | GPF | CPF |
|---|---|---|---|
| 0 | 64.7 | 16.1 | 2.41 |
| 3 | 68.8 | 14.2 | 2.18 |
| 6 | 69.6 | 17.3 | 2.36 |
| 9 | 69.1 | 14.8 | 2.16 |
| 12 | 64.9 | 13.8 | 2.16 |

It will be seen that the addition of porosity has made a substantial reduction in the gas forming effect of the metal poisoning at the above loading, as is evidenced by the substantial reduction in the GPF.

The relative magnitude of the GPF for each sample is a measure of the relative magnitude of the amount of hydrogen produced and the relative magnitude of the carbon producing factor (CPF) is a measure of the relative carbon producing properties of the catalyst. The lower the value of these factors, the less carbon is produced at like conversions.

EXAMPLE V

The modification of the pore structure of a substrate is exemplified by the modification of the pore volume of pseudoboehmite alumina such as is employed in U.S. Pat. No. 4,196,101 (see Examples I and II). The pseudoboehmite (Type A) water mixture which may be acidified as described above is mixed with the selected percent of acidified carbon black of the selected particle size for example those employed in the above examples and dried to extrusion consistancy (about 60% moisture) and extruded through dies of about 1/16" or 1/32" diameters holes and cut to about ⅛" lengths, dried and calcined as described in the above identified patent to harden the pellet and to burn off the carbon. The pellets of improved pore structures may be used to form catalysts by impregnation of the pellet with catalytic compound. Such a procedure is illustrated by the examples of said U.S. Pat. No. 4,196,101 which is incorporated into this application by this reference.

Our presently preferred embodiment and best mode of a process for forming the preferred catalyst is exemplified by Example 1.

APPENDIX

The identification of volume and surface areas of pores of various configurations in any system of pores in a porous solid is still empirically determined. A common method is to employ nitrogen to develop an adsorption isotherm and also in some cases a desorption isotherm. The value of the total pore volumes, the total surface area of the pores of a porous solid are determined from the isotherms [see Brunauer "Adsorption of Gases and Vapors," Vol. 1, Princeton University Press, 1943, Brunauer et al., J.A.C.S. Vol. 60, pg. 309, etc. (1938)].

The distribution of the values of the pore volume and surface area in various ranges of the equivalent pore diameters in a heterogeneous pore structure may be determined from the nitrogen isotherms.

A widely used test and one employed in the determination of the surface areas and pore volumes in this application determines them from nitrogen isotherms and employs a computerized apparatus, as is identified as follows. (Digisorb 2500 manufactured by the Micromeritic Instrument Corp. of 5680 Goshen Springs Rd., Norcross, Ga. 30071)

The sample is dried by heating at about 500° F. until it is volatile free under these conditions. The procedure employing this instrument determines the parameters for a nitrogen adsorption and a desorption isotherm and determines the so-called B.E.T. surface area by application of equation as given on page 312 of the above J.A.C.S. article (known as the B.E.T. equation). The slope and intercept of the linear relation according to that equation is determined. The equation evaluates the volume of the gas as a mono molecular layer of nitrogen adsorbed on the surfaces of the pores. From the known diameter of the nitrogen molecule and the volume of the mono-layer, the magnitude of the surface of the pores carrying the mono-layer is evaluated. To evaluate the slope and intercept of the above linear relation, the separate values of the relative pressure (P/Po) of the selected portion of the isotherm are chosen. P is the local pressure selected and Po is the saturation pressure. The linear relation is determined as the least square fit to the above B.E.T. linear equation.

The B.E.T. Surface area (S) in meters square per gram is given by the following equation which includes the value of the area covered by the nitrogen molecule 16.2 $Å^2$. According to the equation:

$$S = 4.35/(a+b) \qquad \text{Equation 1}$$

where S is the Surface area in square meters per gram ($M^2$/gm); "a" is the above intercept of the linear relation and "b" is the slope of said linear relation. This value is referred to as the B.E.T. surface, and is so referred to in this application.

The pore volume is determined from the volume of nitrogen gas adsorbed at saturation evaluated at standard conditions converted to liquid nitrogen by multiplying the volume of gaseous nitrogen adsorbed at standard conditions by the factor $1.558 \times 10^{-3}$ to yield the equivalent volume of adsorbed nitrogen in cc/gm herein referred to as "Specific Pore Volume."

In determining the distribution of the pore volume and pore surfaces in the pores of various diameters is the sample, the Kelvin radius, which assumes a cylindrical pore is determined corresponding to the various levels of relative pressures in the isotherms. Adjustment is made to reflect the thickness of the adsorbed nitrogen in the pores as a function of the various relative pressures (P/Po) of the isotherms.

The thickness of the adsorbed nitrogen (t) is given by:

$$t = 3.54(-5/\ln(P/Po))^{\frac{1}{3}} \qquad \text{Equation 2}$$

where ln(P/Po) is the natural log of the relative pressure P/Po of the selected portion of the desorption isotherm.

To evaluate the surface ares ($\overline{M^2}$/gm) and pore volume (cc/gm) in the pores of different pore radii corresponding to the various values of (P/Po) along the isotherms, (either adsorption or desorption isotherm whichever is selected), the following relation is followed in the above Digisorb apparatus. The values of pore volume and pore surface stated in the following portion of this specification are those derived from this apparatus.

The radius (r) is the so-called Kelvin radius derived from the Kelvin equation [see Brunauer "Adsorption of Gases and Vapors" and Lippius, et al., "Journal of Catalysis," Vol. 3, pg. 32 at p. 35 (1964)]. The radius of the pore is taken as:

$$r = r_c - t = [-9.53/\ln(P/Po)] \qquad \text{Equation 3}$$

where r is the radius of the pore; t is the thickness and r is the portion of the radius which is not occupied by the layer thickness (t). Each increment of condensate desorbed as the relative pressure is decreased in the developed desorption isotherm, is comprised filled with liquid and from the surface of unfilled pores.

$$Dv_p = Dv - Dv_s \qquad \text{Equation 4}$$

Dv is obtained directly from the desorption isotherm.

$$Dv_s = Dt \Sigma DS_p \qquad \text{Equation 5}$$

where Dt is the change in thickness (t), and $\Sigma DS_p$ is all pore surface area other than those of the filled pores. For each desorption increment the surface area attributable to any group of pores of radius $r_1$ and $r_2$ is given by the following:

$$DS_p = 2DV_p/\bar{r}_c \qquad \text{Equation 6}$$

where $\bar{r}_c$ is the average of the group $r_1 = r_2$, i.e. 0.5 $(r_1 + r_2)$ pore radii desorbed and $DV_p$ is the corresponding pore volume of the group and is given by:

$$DV_p = Dv \, (\bar{r}_c/(\bar{r}_c - t))^2 \qquad \text{Equation 7}$$

Since the desorption isotherm is measured in terms of gas volume at standard conditions and the surface area and pore volume as above requires the conversion to equivalent liquid parameters the above conversion of the isotherm data to surface area and pore volume employing the above constants are applied here also. (See Equation 1, and conversion factors.) The equivalent pore volume and pore surface area for each pore radius interval is obtained by applying the above computation scheme.

The volume ($v_1$) of liquid desorbed from one pore radius ($r_o$) to the next smaller pore radius ($\bar{r}_1$), is given by the following relation:

$$v_1 = [\bar{r}_1/(\bar{r}_1 - t)]^2 q \qquad \text{Equation 8}$$

where $\bar{r}_1$ is the average next smaller interval 0.5 $(r_0 - r_1)$ and t is the thickness at $\bar{r}_1$ (Equation 2).

$$q = v_0 - v_1 \qquad \text{Equation 9}$$

q is equal to the volume of gas (as liquid) desorbed between radius $r_0$ and $r_1$, $v_0$ is the volume of gas (as liquid) adsorbed at $r_0$ and $v_1$ is the volume of gas adsorbed (as liquid) at $r_1$. t has the meaning of Equation 2.

The pore volume and pore surface corresponding to each increment of relative pressure of the desorption isotherm and the corresponding pore radii may then be determined by applying the above consideration to each step of the desorption isotherm. The above computation scheme is applicable down to 10 Ångstrom radius.

The relation of the surface area in the pores of radius (r) corresponding to the increment of desorbed gas (as liquid) is given by the following relation:

$$DS_p = 2V_p/\bar{r}_c \qquad \text{Equation 10}$$

From the above, the value of the pore volume is evaluated as cubic cm per gram (cc/gm) and the value of the pore surface [evaluated as meters square per gram ($\overline{M^2}$/gm)] for each selected interval of pore radii (or diameter) corresponding to the equivalent interval of the relative pressure (P/Po) of the isotherm, in the present case, from the desorption isotherm. In the case of the examples reported, the ranges of the intervals of (P/Po) of the desorption isotherm were selected to be equivalent to the following intervals of radii $r_1$ and $r_2$.

MICRO-ACTIVITY TEST

A test oil (ASTM Subcommittee D-32, Standard FHC 893) is vaporized and passed through a bed of microspheres produced by spray drying of the catalyst. Spray dried microspheres of the catalyst are of a particle size within the range of 50–70 microns.

The catalyst charge is 4.00±0.05 grams and 1.33±0.03 grams of oil is passed through the catalyst bed over a period of 75 seconds. The catalyst is prepared by heating a shallow bed of the catalyst for three (3) hours in air at 1050° F. and then steamed for two (2) hours at 1450° F. and another sample is steamed at 1500° F. for two (2) hours and another sample is steamed at 1550° F. for two (2) hours. The oil passed through a preheat zone and through a bed of the microspheres maintained at a temperature of 900°±2° F. at a weight hourly space velocity (WHSV) of 16.

The vapors and gases passing from the bed are condensed in an ice bath and the uncondensed gases collected over water.

The following observations are made. The weight of the condensate and the volume and temperature of the gases are determined. The liquid condensate fraction is analyzed and the percent by weight of the liquid fraction which is boiled above 421° F. is determined. The volume and temperature of the gases collected over the water are measured and the volume reduced to standard conditions. The uncondensed gases are analyzed and the weight percent of the gases which is hydrogen, isopentane, and hexanes is determined and their weight percent of the feed determined. The weight percent of the liquid charge is determined from the following relation:

F is the weight of the oil passing through the reactor;
L is the weight of the liquid product which is collected as condensate;
R is the percent by weight of the fraction of the liquid condensate which boils above 421° F.;
H is the grams of liquid held up in the reactor exit line and around the reactor, receiver and joints.

In the above test it has been determined that it constitutes three percent of the feed F. The weight percent conversion (%C) is given by the following relationship.

$$\%C = \frac{F - \frac{R \times L}{100} - H}{F} \times 100$$

The conversion using the catalyst steamed at 1450° F. is termed M conversion, the one steamed at 1500° F. is termed S conversion, and the one steamed at 1550° F. is termed S+ conversion.

We claim:

1. In the process of increasing the pore volume of an alumina-containing calcined catalyst support by incorporating combustible solid particles in the support prior to calcination and calcining the support containing the combustible particles, the improvement which comprises determining the average pore-size distribution and the pore volume of an alumina-containing particulate support prior to incorporating combustible particles, preparing an acidified, aqueous dispersion of carbon black particles, the particles having a preselected particle-size distribution, as determined by measuring the average particle diameter of the carbon black, in order to amplify only those pores of the alumina-containing support which have smaller diameters than those of the carbon black particles, admixing the aqueous dispersion with the particulate support, drying the mixture and calcining the dried mixture at a temperature sufficient to combust the carbon black particles and recovering a support having increased pore volume in the preselected pore-size range.

2. The process of claim 1, wherein the major proportion of the total pore volume of the support is represented by pores of less than 100 Å and the carbon black particles have particle diameters in excess of 100 Å.

3. The process of claim 1, wherein the support is a zeolite.

4. The process of claim 1, wherein the support is a mixture of a zeolite, pseudoboehmitic alumina and clay.

5. The process of claim 4, wherein the zeolite is an ammonium-exchanged Y-zeolite.

6. The process of claim 4, wherein the zeolite is a rare earth metal-exchanged Y-zeolite.

7. The process of claim 1 wherein the aqueous dispersion of the carbon black particles is acidified with an acid selected from nitric and formic acids.

8. The process of claim 1, wherein the acidification of the aqueous dispersion of carbon black particles is accomplished subsequent to the admixture with the particulate support.

* * * * *

UNITED STATES PATENT AND TRADEMARK OFFICE
CERTIFICATE OF CORRECTION

PATENT NO. : 4,356,113

DATED : October 26, 1982

INVENTOR(S) : John Lim et al.

It is certified that error appears in the above-identified patent and that said Letters Patent is hereby corrected as shown below:

Column 4, line 55, "volumes" should read -- volume --.

Column 7, line 6, "volatile fee" should read -- volatile free --.

Column 9, line 41, "$r_1=4_2$" should read -- $r_1-r_2$ --.

Column 9, line 57, "$(r_1)$" should read -- $(\bar{r}_1)$ --.

Signed and Sealed this

Fourth Day of June 1985

[SEAL]

Attest:

DONALD J. QUIGG

Attesting Officer     Acting Commissioner of Patents and Trademarks